United States Patent
Chung et al.

(10) Patent No.: US 8,473,815 B2
(45) Date of Patent: Jun. 25, 2013

(54) METHODS AND SYSTEMS OF A FLASH MEMORY CONTROLLER AND AN ERROR CORRECTION CODE (ECC) CONTROLLER USING VARIABLE-LENGTH SEGMENTED ECC DATA

(75) Inventors: Shen Ming Chung, Chiayi County (TW); Yi Cheng Chung, Penghu County (TW)

(73) Assignee: Industrial Technology Research Institute, Hsinchu (TW)

( * ) Notice: Subject to any disclaimer, the term of this patent is extended or adjusted under 35 U.S.C. 154(b) by 907 days.

(21) Appl. No.: 12/341,452

(22) Filed: Dec. 22, 2008

(65) Prior Publication Data

US 2010/0162083 A1 Jun. 24, 2010

(51) Int. Cl.
*G11C 29/00* (2006.01)
(52) U.S. Cl.
USPC ........................................................ 714/766
(58) Field of Classification Search
USPC ............. 714/763–766, 768, 779; 365/185.09, 365/185.29, 185.33
See application file for complete search history.

(56) References Cited

U.S. PATENT DOCUMENTS

| | | | | |
|---|---|---|---|---|
| 5,459,850 A * | 10/1995 | Clay et al. | ...................... | 711/171 |
| 6,499,083 B1 * | 12/2002 | Hamlin | ......................... | 711/112 |
| 6,981,198 B2 * | 12/2005 | Boyer et al. | ................... | 714/774 |
| 7,117,421 B1 * | 10/2006 | Danilak | ......................... | 714/763 |
| 2002/0162070 A1 | 10/2002 | Boyer et al. | | |
| 2003/0037299 A1 | 2/2003 | Smith | | |
| 2004/0083334 A1 * | 4/2004 | Chang et al. | ................... | 711/103 |
| 2007/0226592 A1 | 9/2007 | Radke | | |
| 2007/0266291 A1 | 11/2007 | Toda et al. | | |
| 2007/0300130 A1 * | 12/2007 | Gorobets | ....................... | 714/766 |
| 2008/0072120 A1 | 3/2008 | Radke | | |
| 2008/0168319 A1 | 7/2008 | Lee et al. | | |
| 2010/0122148 A1 * | 5/2010 | Flynn et al. | .................... | 714/773 |

OTHER PUBLICATIONS

European Search Report dated Jul. 10, 2009 for corresponding European application.

* cited by examiner

*Primary Examiner* — Scott Baderman
*Assistant Examiner* — Joseph Kudirka
(74) *Attorney, Agent, or Firm* — WPAT, P.C.; Anthony King

(57) ABSTRACT

An ECC controller comprises an ECC encoder, an ECC divider, an ECC constructor and an ECC decoder. The ECC encoder is configured to generate ECC data with different lengths in response to information data to be stored into a flash memory. The ECC divider is configured to divide each ECC datum generated by the ECC encoder into one or more ECC segments according to the length of the ECC datum. The ECC constructor is configured to generate an ECC datum by combining one or more ECC segments for each information datum read from the flash memory. The ECC decoder is configured to correct the errors of the information data read from the flash memory device by using the ECC data generated by the ECC constructor.

34 Claims, 8 Drawing Sheets

METHODS AND SYSTEMS OF A FLASH MEMORY CONTROLLER AND AN ERROR CORRECTION CODE (ECC) CONTROLLER USING VARIABLE-LENGTH SEGMENTED ECC DATA

BACKGROUND OF THE INVENTION

1. Field of the Invention

The present invention relates to a flash memory, and more particularly, to methods and systems of error correction code (ECC) for a flash memory.

2. Description of the Related Art

Due to increasing capacities, flash memories have become an alternative to the traditional motor-driven disks in many applications, such as portable devices. Since flash memories contain no mechanical parts, they exhibit advantages such as shock resistance, low power consumption and high speed compared to motor-driven disks. However, flash memories have their own limitations. One limitation is that each read/write unit of a flash memory should be erased before writing. Another limitation is that each read/write unit of a flash memory has a limited life of erase-write cycles, and exceeding the limited erase-write cycles may cause unpredictable defective bits spread throughout the flash memory.

Traditionally, a flash memory can utilize techniques such as the ECC, Wear-Leveling Algorithm (WLA) and Bad Block Management (BBM) to reduce the performance degradation caused by the above limitations and thus lengthen the lifetime of the flash memory. To utilize the ECC, WLA and BBM techniques, each flash page, which is the smallest read/write unit of a flash memory, should comprise a data area and a spare area, wherein the data area stores the user data and the spare area stores the management data including the information required by ECC, WLA and BBM techniques.

However, a flash memory can only erase one flash block at a time. Furthermore, a flash block usually contains 32 or more flash pages. Therefore, once the number of defective bits exceeds the correction capability of a flash page, the whole flash block is usually marked as a defective block by the BBM technique. If marked as a defective block, all the flash pages of the flash block will not be accessed for future read/write operations, which is a waste of memory space, since many flash pages in the same flash block are still within the capacities of the ECC technique and therefore usable.

U.S. Patent Application US2008/0168319 discloses a method and a system. As shown in FIG. 1, an ECC controller 100, encoding and decoding data transacted with a flash memory 1000, comprises an ECC encoder 102 and an ECC decoder 104. The ECC encoder 102 comprises a first encoder 106 and a second encoder 108. The ECC decoder 104 comprises a first decoder 110, a second decoder 114 and a decoding controller 112. The first encoder 106 and the first decoder 110 constitute a codec with high encoding/decoding speed but low ECC capacity, while the second encoder 108 and the second decoder 114 constitute a codec with low encoding/decoding speed but high ECC capacity. For each write datum, the first encoder 106 generates a first ECC datum, and the second encoder 108 generates a second ECC datum, while the length of the second ECC datum is longer than that of the first ECC datum. For each read datum, the first decoder 110 decodes a first ECC codeword, which is the combination of the first ECC datum and the read datum. If the errors of the decoded ECC codeword are beyond the ECC capacity of the first decoder 110, the second decoder 114 then decodes a second ECC codeword, which is the combination of the second ECC datum and the read datum. Consequently, a compromise between the processing speed and the ECC capacity is achieved.

The method and system in U.S. Patent Application US2008/0168319 is that each datum stored in the flash memory 1000 requires two storage spaces for the ECC data, which limits the available memory space. The ECC controller 100 comprises only two ECC codecs, and thus the ECC capacity thereof is fixed. The ECC controller 100 could comprise three or more ECC codecs to enhance the flexibility of the ECC capacity, but this would further limit the available memory space since each datum requires more storage spaces for the ECC data.

In view of the aforesaid conventional techniques, there is a need to design an apparatus and a method to lengthen the lifetime of a flash memory, while reducing the required memory space to far less than that of the conventional techniques.

SUMMARY OF THE INVENTION

Some embodiments of the present invention provide dynamic methods by sharing the spare areas in each flash block. That is, each information datum stored in a flash block of a flash memory may have an ECC datum with variable length, which results in a variable ECC capability based on the characteristic of each flash page. The variable ECC capability increases lifetime of the flash memory. Some embodiments of the present invention provide ECC encoding/decoding methods such that each information datum has only one ECC datum, and therefore the storage capacity is reduced compared to the aforesaid conventional techniques.

The flash memory controller according to one embodiment of the present invention comprises a flash memory interface controller, a host interface controller, an ECC encoder, an ECC divider, an ECC constructor and an ECC decoder. The ECC encoder is configured to receive information data from the host interface controller and generate first ECC data with variable lengths in response to the information data to be stored in a flash memory. The ECC divider is configured to divide each of the first ECC data into one or more ECC segments according to the length of the divided first ECC datum and forward the ECC segments to the flash memory interface controller. The ECC constructor is configured to receive one or more of the ECC segments from the flash memory interface controller and generate a second ECC datum by the received ECC segments for each of the information data read from the flash memory. The ECC decoder is configured to correct errors of the information data read from the flash memory by using the second ECC data and forward the corrected information data to the host interface controller.

The ECC controller for a flash memory according to another embodiment of the present invention comprises an ECC encoder, an ECC divider, an ECC constructor and an ECC decoder. The ECC encoder is configured to generate first ECC data with variable length in response to information data to be stored in a flash memory. The ECC divider is configured to divide each of the first ECC data into one or more ECC segments according to the length of the divided first ECC datum. The ECC constructor is configured to generate an ECC datum by combining one or more ECC segments for each information datum read from the flash memory. The ECC decoder is configured to correct the errors of the information data read from the flash memory by using the ECC data generated by the ECC constructor.

The flash memory system according to another embodiment of the present invention comprises a flash memory and flash memory controller according to the embodiments of the present invention.

The method for correcting errors of the information data to be stored in a flash memory according to another embodiment of the present invention comprises: generating an ECC datum in response to an information datum to be stored in a flash memory; dividing the ECC datum into one or more ECC segments; storing the information datum to a flash page of a flash block of the flash memory; and storing the ECC segments to a plurality of flash pages of the flash block of the flash memory.

The method for correcting errors of information data stored in a flash memory according to another embodiment of the present invention comprises reading an information datum stored in a flash memory; combining one or more ECC segments stored in the flash memory into an ECC datum corresponding to the information datum; and correcting errors of the information datum by decoding the ECC codeword formed by the information datum and the ECC datum.

BRIEF DESCRIPTION OF THE DRAWINGS

The objectives and advantages of the present invention will become apparent upon reading the following description and upon referring to the accompanying drawings, of which.

DETAILED DESCRIPTION OF THE INVENTION

Embodiments of the present invention will now be described more fully with reference to the accompanying drawings. The present invention may, however, be embodied in many different forms and should not be construed as limited to the embodiments set forth herein. Rather, these embodiments are provided so that this disclosure will be thorough and complete, and will fully convey the scope of the present invention to those skilled in the art.

Figure 1:
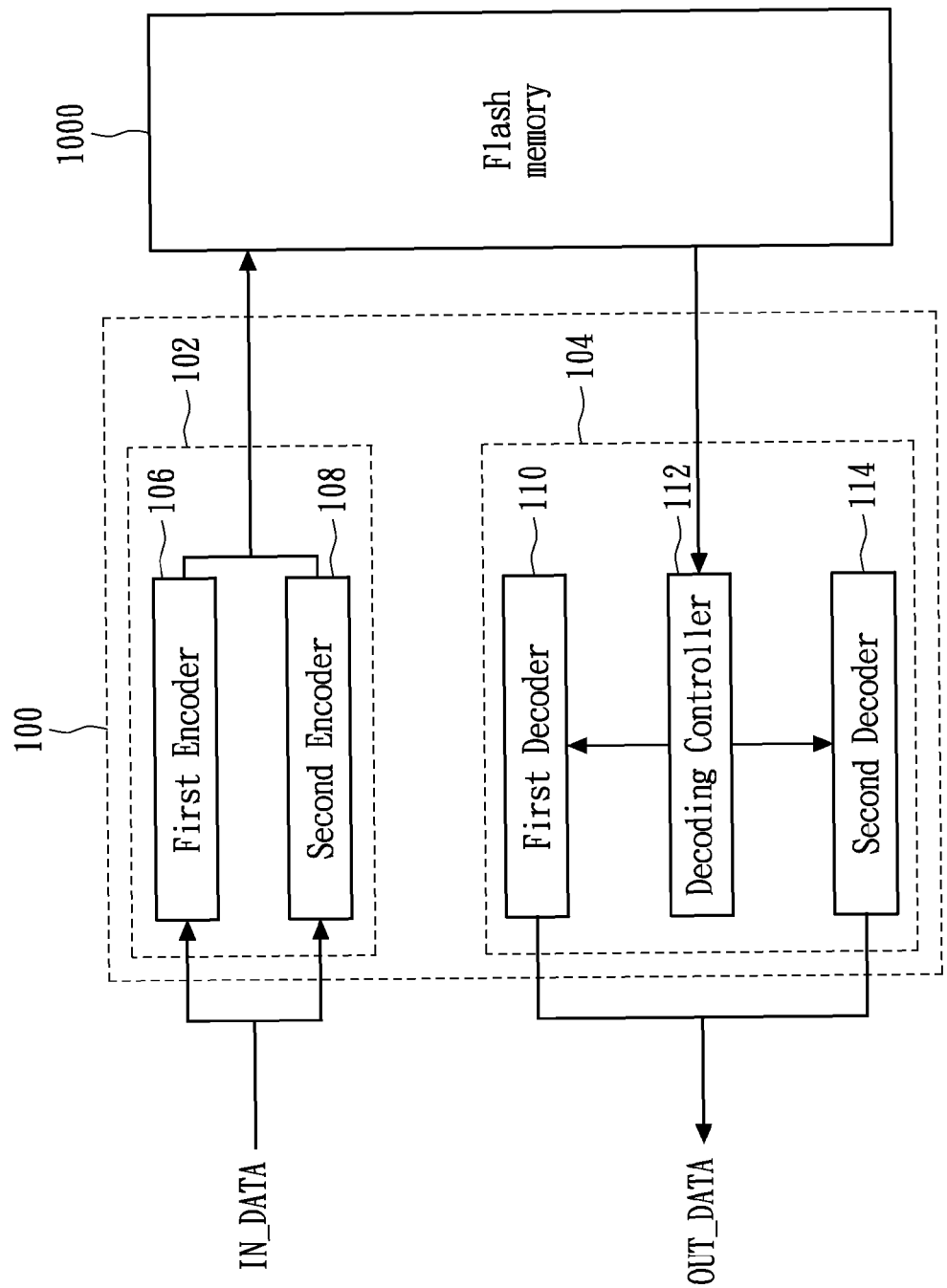
FIG. 1 shows a conventional ECC controller disclosed in U.S. Patent Application US2008/0168319.
Figure 2:
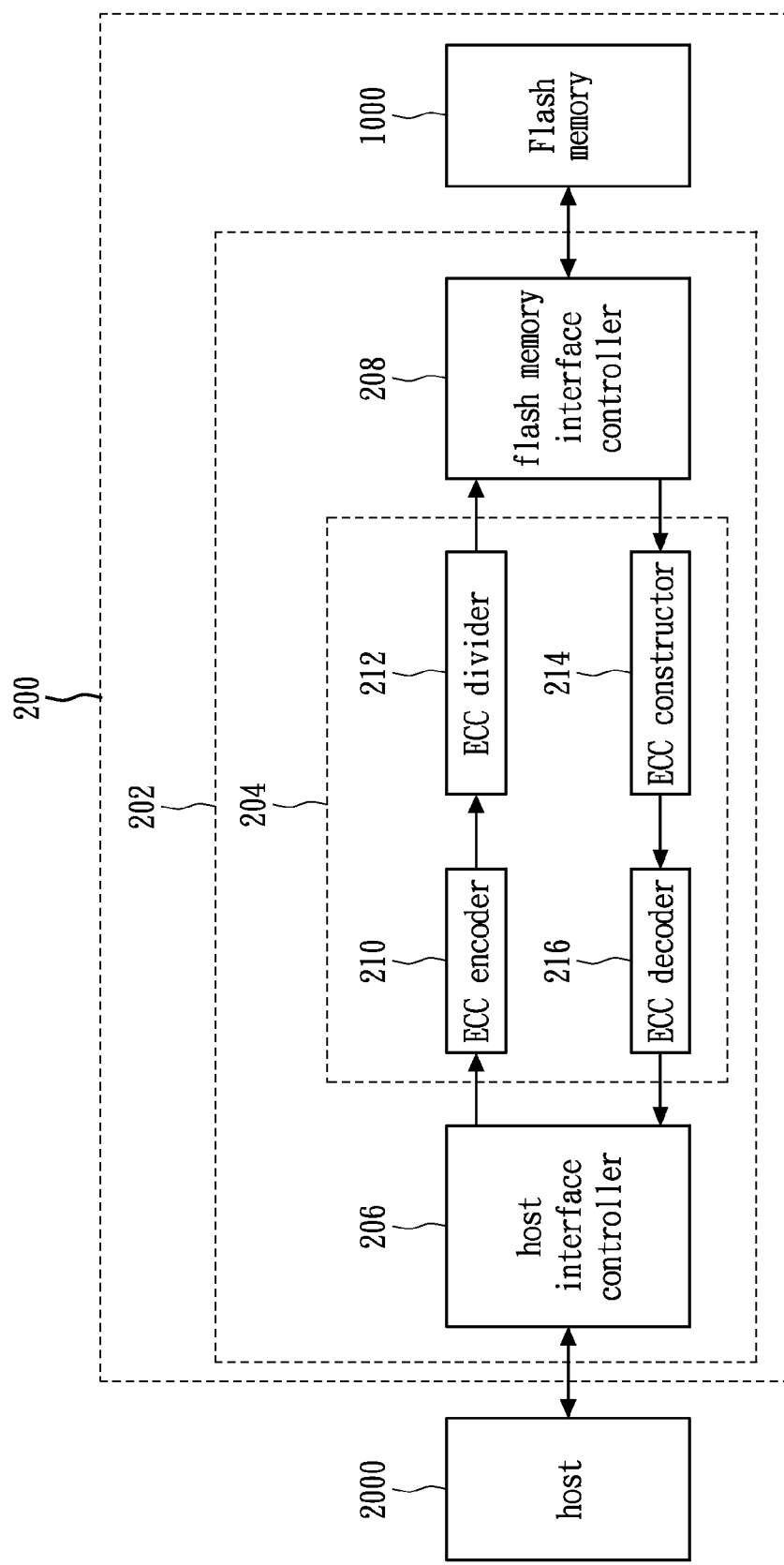
FIG. 2 shows a block diagram of a flash memory system according to embodiments of the present invention.

FIG. 2 shows a block diagram of a flash memory system according to embodiments of the present invention. The flash memory system 200 comprises a flash memory controller 202 and a flash memory 1000. The flash memory controller 202 comprises an ECC controller 204, a host interface controller 206 and a flash memory interface controller 208. The host interface controller 206 transacts data with a host 2000 via a host interface. The flash memory interface controller 208 transacts data with the flash memory 1000 via a flash memory interface. The ECC controller 204 comprises an ECC encoder 210, an ECC divider 212, an ECC constructor 214 and an ECC decoder 216. The ECC encoder 210 is configured to generate ECC data with variable lengths in response to information data to be stored in the flash memory 1000. The ECC divider 212 is configured to divide each ECC datum generated by the ECC encoder 210 into one or more ECC segments according to the length of the ECC datum. The ECC constructor 214 is configured to generate an ECC datum by combining one or more ECC segments for each information datum read from the flash memory 1000. The ECC decoder 216 is configured to correct the errors of the information data read from the flash memory 1000 based on the ECC data generated by the ECC constructor 214.

Figure 3:
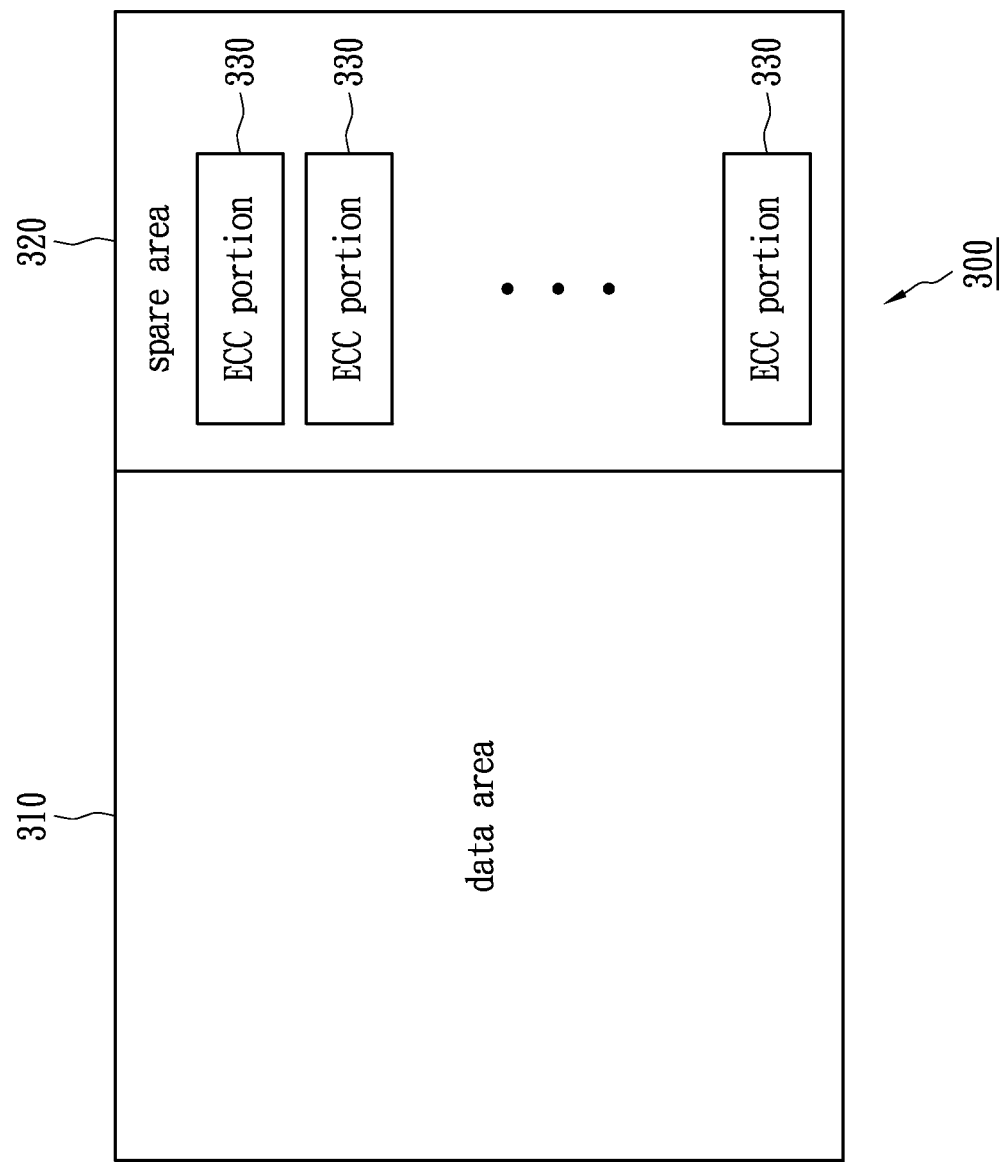
FIG. 3 shows a block diagram of a flash page according to embodiments of the present invention.

FIG. 3 shows a block diagram of a flash page according to embodiments of the present invention. The flash page 300 comprises a data area 310 and a spare area 320, wherein the data area 310 stores the user data and the spare area 320 stores the management data. The spare area 320 comprises a plurality of ECC portions 330, wherein each ECC portion stores an ECC datum or a segment of an ECC datum. In certain embodiments of the present invention, each spare area 320 comprises a total of two ECC portions 330. In some embodiments of the present invention, each ECC segment stored in the ECC portions 330 in a flash page 300 belongs to different ECC data.

Referring to FIG. 2 and FIG. 3, in some embodiments of the present invention, during the write operation, the flash memory interface controller 208 accesses the flash memory 1000 and determines the length of the ECC datum corresponding to the data area 310 in which an information datum is to be stored. The ECC encoder 210 then generates the ECC datum with the determined length in response to the information datum to be stored into the data area 310. The ECC divider 212 then divides the encoded ECC datum into one or more ECC segments. The flash memory interface controller 208 then accesses the flash memory 1000 and stores the information datum and ECC segments into the data area 310 and a plurality of spare areas 320. In certain embodiments of the present invention, the first ECC segment and the information datum are stored in the same flash page 300.

Figure 4:
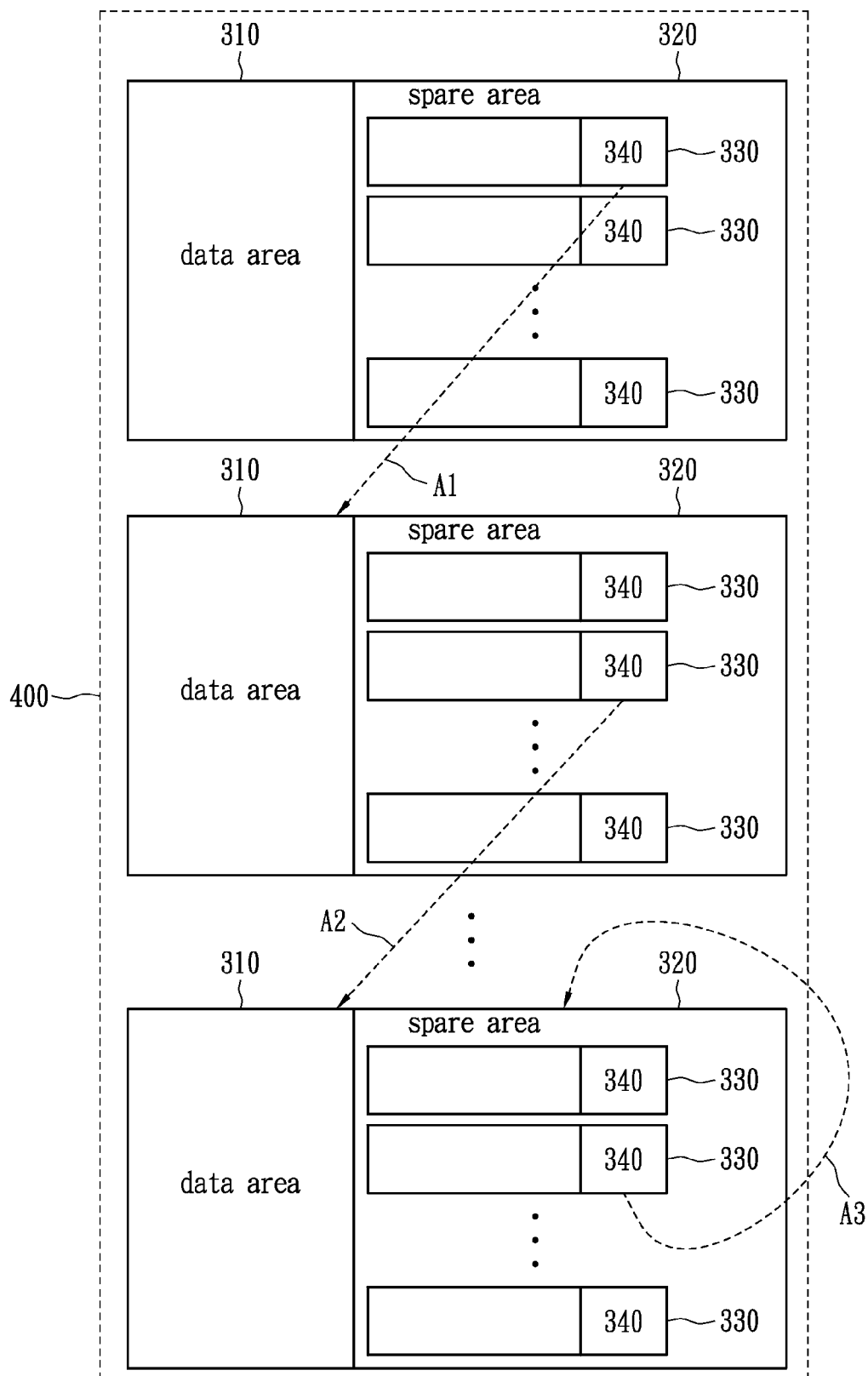
FIG. 4 shows a block diagram of a flash block according to embodiments of the present invention.

FIG. 4 shows a block diagram of a flash block according to embodiments of the present invention. The flash block 400 comprises a plurality of flash pages 300, as shown in FIG. 3. In certain embodiments of the present invention, each ECC portion 330 further comprises a pointer field 340, wherein the pointer in a pointer field 340 points to the next ECC portion storing the next ECC segment. For example, in some embodiments of the present invention, if an ECC datum is divided into three ECC segments, then the first ECC segment is stored in a first ECC portion 330 of the flash page 300 storing the information datum corresponding to the ECC datum. The pointer field 340 of the first ECC portion 330 points, as indicated by the arrow A1, to another flash page 300, in which a second ECC portion 330 stores the second ECC segment. The pointer field 340 of the second ECC portion 330 points, as indicated by the arrow A2, to yet another flash page 300, in which a third ECC portion 330 stores the third ECC segment, and the pointer field 340 of the third ECC portion 330 points, as indicated by the arrow A3, to itself or stores a NULL character to indicate that the ECC portion stores the last ECC segment of the ECC datum.

Referring to FIG. 2 and FIG. 4, in some embodiments of the present invention, during the write operation, the length of the ECC datum is determined by linking the ECC portions 330, which store the ECC segments corresponding to the ECC datum, and the linking relationship is indicated by the pointer fields 340.

Referring to FIG. 2 and FIG. 3, in some embodiments of the present invention, during the read operation, the flash memory interface controller 208 accesses the flash memory 1000 and reads an information datum from a data area 310 of a flash page 300, wherein one or more ECC segments stored in the ECC portions 330 are read along with the information datum, and the locations of the ECC portions storing the ECC segments are indicated by the pointer fields 340. The ECC constructor 214 then constructs an ECC datum by combining the ECC segments. The ECC decoder 216 then decodes the ECC codeword combined by the ECC datum and the information datum and corrects the errors thereof. In some embodiments of the present invention, if the number of corrected errors exceeds a threshold, the ECC capability corresponding to the flash page 300 storing the read information datum is enhanced. That is, the length of the ECC datum for the next information datum to be stored in the flash page 300 is increased by linking the last ECC portion 330 corresponding to the flash page 300 to another available ECC portion 330.

In some embodiments of the present invention, the flash memory controller 202 also stores a bitmap for each flash block 400 in the flash memory 1000 indicating the availability of the ECC portions 330 of the flash block 400. As the ECC capability of a flash page is to be enhanced, the bitmap of the flash block storing the flash page is looked up to find an available ECC portion to be linked.

Figure 5:
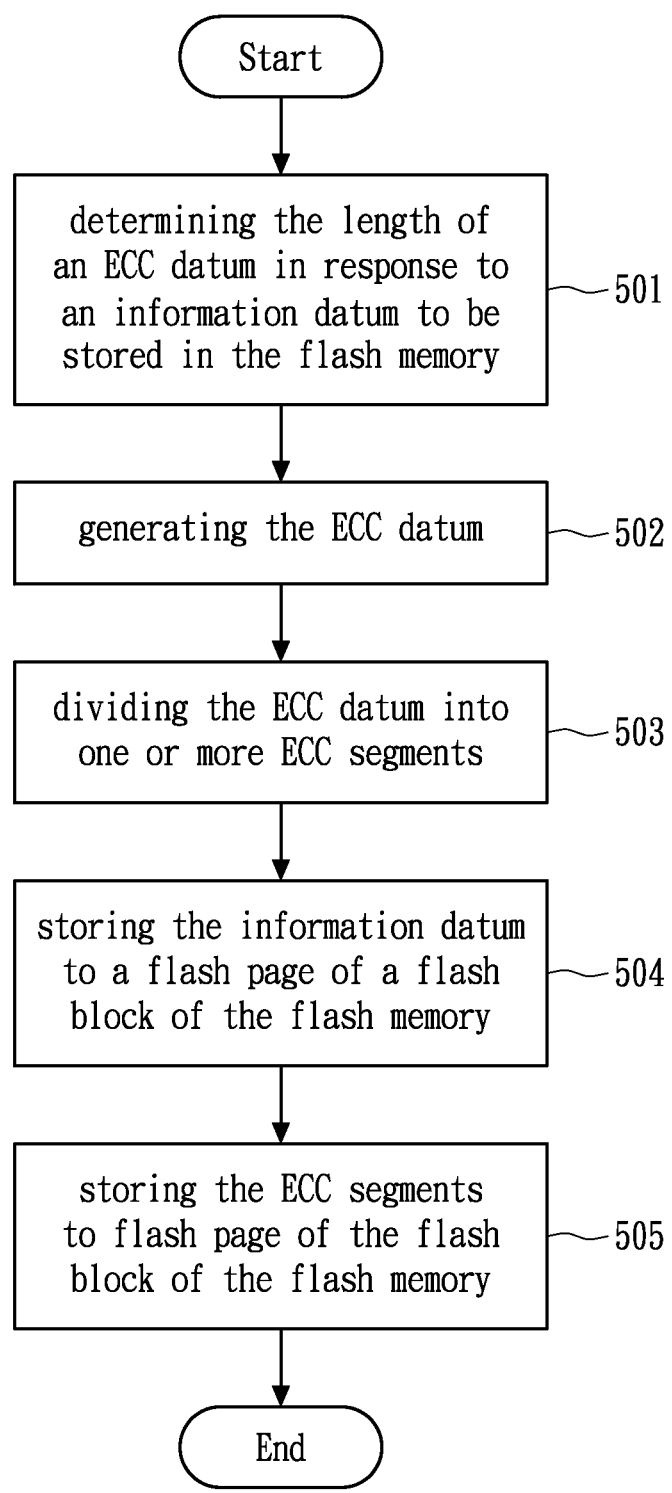
FIG. 5 shows a flow chart of a method for encoding ECC data for information data to be stored in a flash memory according to embodiments of the present invention.

FIG. 5 shows a flow chart of a method for encoding ECC data for information data to be stored in a flash memory according to embodiments of the present invention, which may refer to the flash memory system 200 shown in FIG. 2. In step 501, the length of an ECC datum in response to an information datum to be stored in the flash memory 1000 is determined. In step 502, the ECC datum is generated. In step 503, the ECC datum is divided into a plurality of ECC segments. In step 504, the information datum is stored to a flash page 300 of a flash block 400 of the flash memory 1000. In step 505, the ECC segments are stored to a plurality of flash pages 300 of the flash block 400 of the flash memory 1000.

Figure 6:
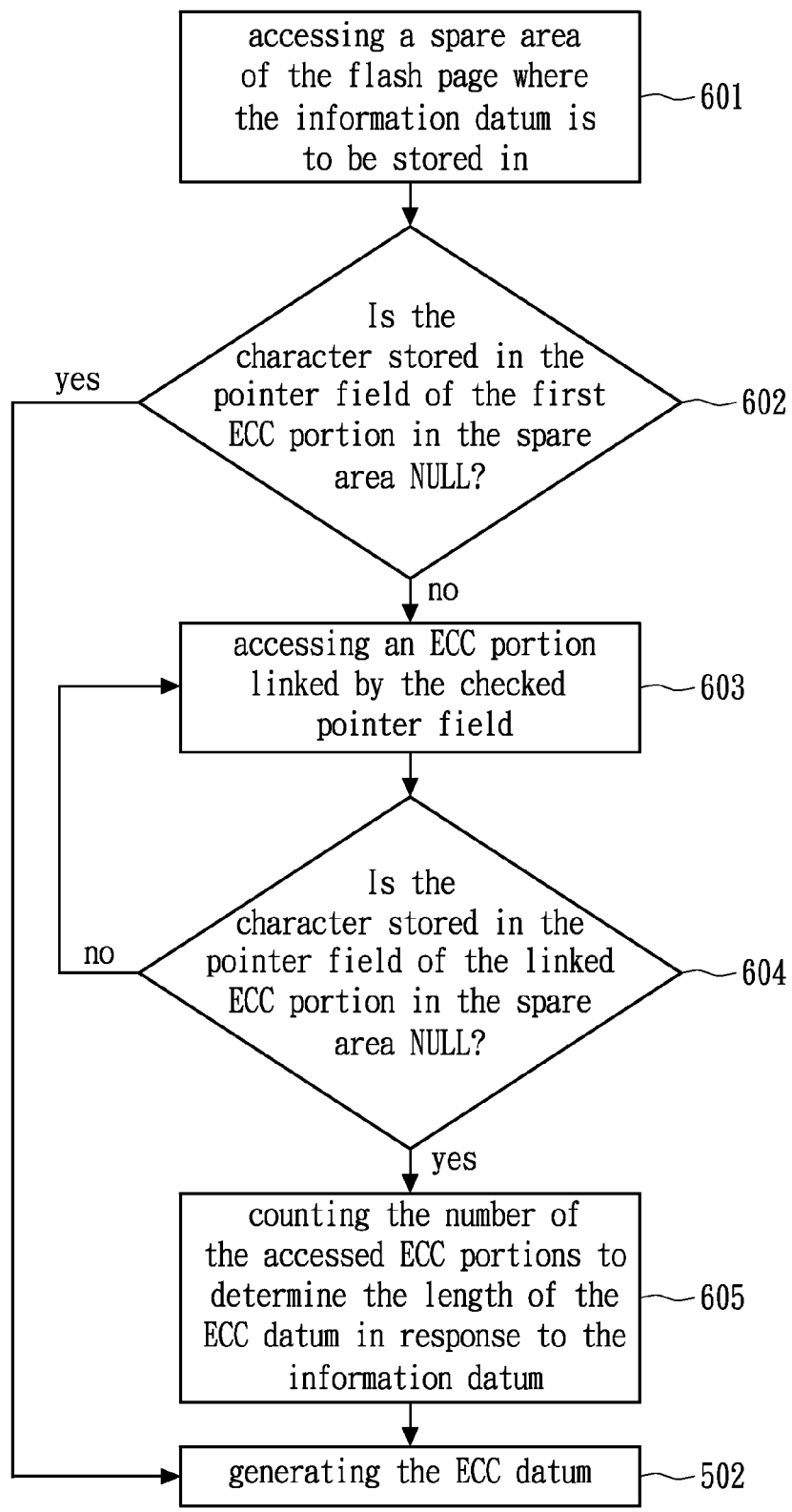
FIG. 6 shows a partial flow chart of a method for encoding ECC data for information data to be stored in a flash memory according to embodiments of the present invention.

In some embodiments of the present invention, the step 501 comprises the sub-steps as shown in FIG. 6. In step 601, a spare area 320 of the flash page 300 which the information datum to be stored in is accessed, and step 602 is executed. In step 602, the pointer field 340 of the first ECC portion 330 in the spare area 320 is checked. If the pointer field 340 stores a NULL character, step 502 is executed; otherwise, step 603 is executed. In step 603, an ECC portion 330 of this or another flash page 300 linked by the checked pointer field 340 is accessed, and step 604 is executed. In step 604, the pointer field 340 of the linked ECC portion 330 is checked. If the pointer field 340 stores a NULL character, step 605 is executed; otherwise, step 603 is executed. In step 605, the number of accessed ECC portions is counted to determine the length of the ECC datum in response to the information datum, and step 502 is executed.

Figure 7:
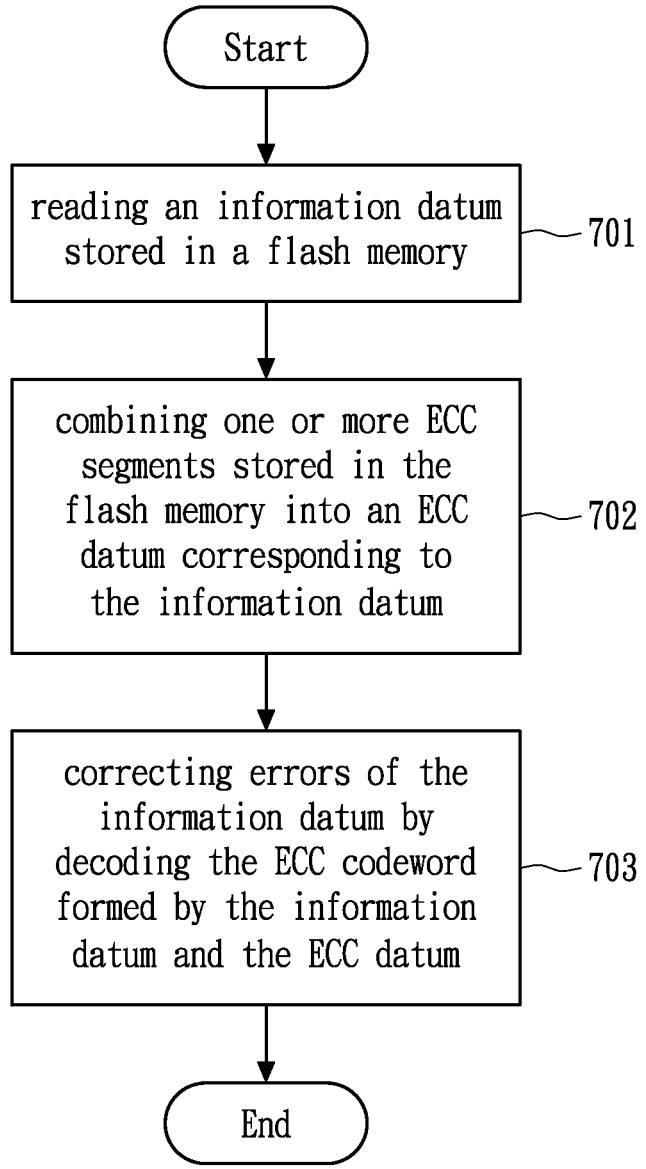
FIG. 7 shows a flow chart of a method for correcting errors of information data stored in a flash memory according to another embodiment of the present invention.

FIG. 7 shows a flow chart of a method for correcting errors of information data stored in a flash memory according to another embodiment of the present invention, which may refer to the flash memory system 200 shown in FIG. 2. In step 701, an information datum stored in a flash memory 1000 is read. In step 702, one or more ECC segments stored in the flash memory 1000 are combined into an ECC datum corresponding to the information datum. In step 703, errors of the information datum are corrected by decoding the ECC codeword formed by the information datum and the ECC datum.

Figure 8:
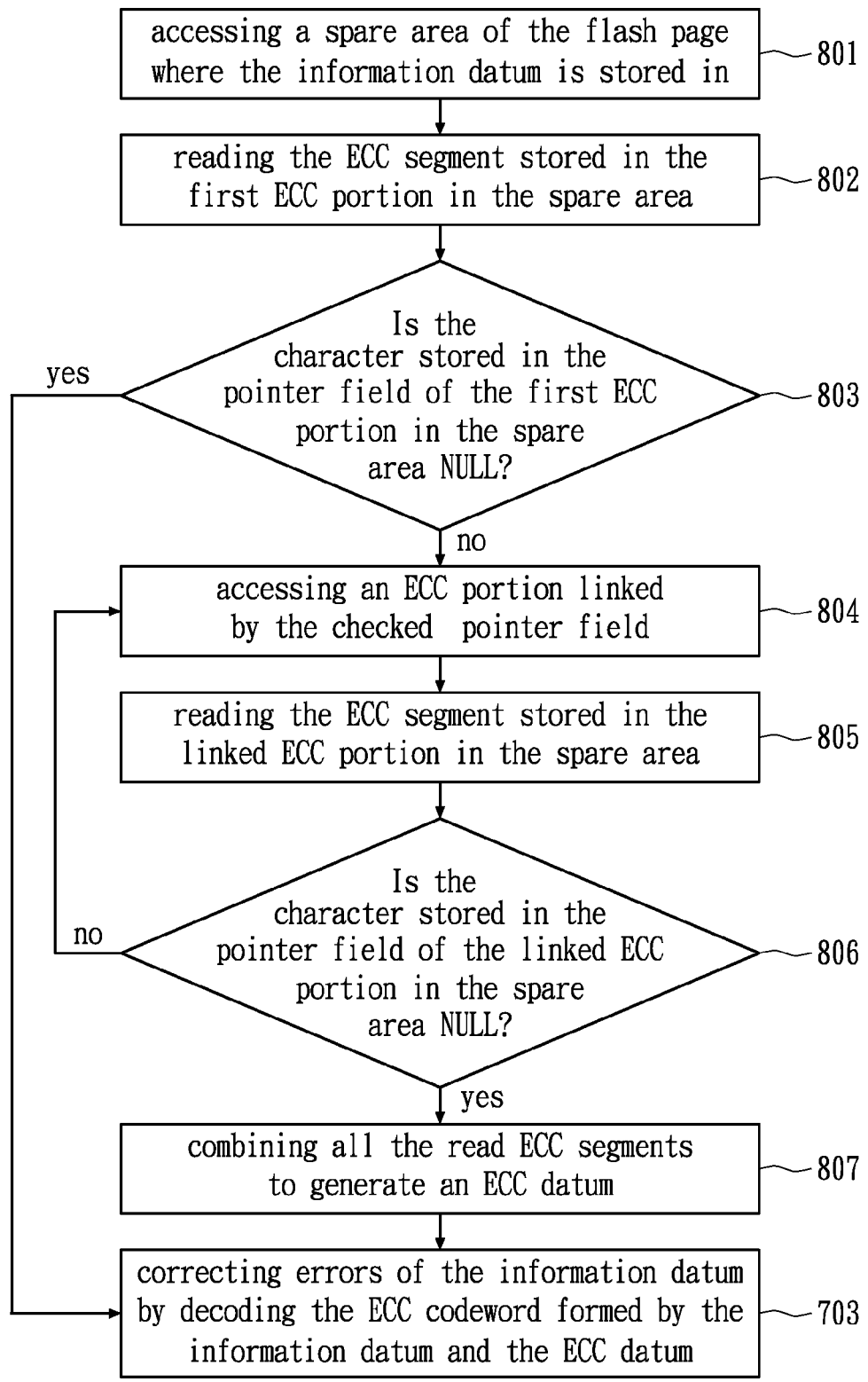
FIG. 8 shows a partial flow chart of a method for correcting errors of information data stored in a flash memory according to another embodiment of the present invention.

In some embodiments of the present invention, step 702 comprises the sub-steps as shown in FIG. 8. In step 801, a spare area 320 of the flash page 300 in which the information datum is to be stored is accessed, and step 802 is executed. In step 802, the ECC segment stored in the first ECC portion 330 in the spare area 320 is read, and step 803 is executed. In step 803, the pointer field 340 of the first ECC portion 330 is checked. If the pointer field 340 stores a NULL character, step 703 is executed; otherwise, step 804 is executed. In step 804, an ECC portion 330 of this or another flash page 300 linked by the checked pointer field 340 is accessed, and step 805 is executed. In step 805, the ECC segment stored in the first ECC portion 330 in the spare area 320 is read, and step 806 is executed. In step 806, the pointer field 340 of the linked ECC portion 330 is checked. If the pointer field 340 stores a NULL character, step 807 is executed; otherwise, step 804 is executed. In step 807, all the read ECC segments are combined to generate an ECC datum, and step 703 is executed.

In certain embodiments of the present invention, each ECC portion 330 of a flash page 300 is link by another flash page 300 except the first ECC portion 330 thereof, which is used for storing the first ECC segment of the data area 310 of the present flash page 300. In some embodiments of the present invention, all flash pages 300 linked by the ECC portions 330 in one flash block 400 are in the same flash block 400.

In some embodiments of the present invention, each flash page 300 comprises a total of two ECC portions 330, wherein one is the first of the ECC portion 330s for storing the first ECC segment of the data area 310 of the same flash page 300, and the other is to be linked by another ECC portion 330 of another flash page 300.

In certain embodiments of the present invention, after the errors of the information datum are corrected as shown in step 703, the number of errors is counted. If the number of the errors exceeds a threshold value, the ECC capability of the data area 310 in which the information datum is stored is enhanced, which may be accomplished by linking another ECC portion to the last ECC portion which originally stores the last ECC segment corresponding to the flash page 300 the data area 310 is in.

In conclusion, to a defect-vulnerable flash page, the ECC capability is increased by generating longer ECC data for information data. Since there is a limit of the size of the spare area each flash page can contain, each generated ECC datum can be divided into a plurality of ECC segments and then be stored in the spare areas of a plurality of flash pages. In this way, the flash page with lower defect vulnerability can share a portion of its spare area with the flash pages with higher defect vulnerability. Therefore, even though the defect vulnerability of each flash page in a flash block remains the same, effectively, the defect vulnerability of all of the flash pages within a flash block is balanced, and the time at which the flash block will be marked as defective is postponed.

Compared with the aforesaid conventional techniques, the embodiments of the present invention provide dynamic methods to share the spare areas in each flash block. That is, each data area can be protected by a plurality of spare areas in a flash block when needed, and for a defect-vulnerable flash page, the ECC protection capability thereof is enhanced accordingly. Therefore, the time at which to mark a flash block as defective can be postponed, and the lifetime of the flash memory is lengthened. Meanwhile, each information datum has only one ECC datum. Therefore, unlike the aforesaid conventional techniques, no further storage space is wasted.

The above-described embodiments of the present invention are intended to be illustrative only. Those skilled in the art may devise numerous alternative embodiments without departing from the scope of the following claims.

What is claimed is:

1. A flash memory controller, comprising:
   a flash memory interface controller;
   a host interface controller;
   an error correction code (ECC) encoder configured to receive information data from the host interface controller and generate first ECC data with variable lengths in response to the information data to be stored in a flash memory;
   an ECC divider configured to divide each first ECC datum of the first ECC data into one or more ECC segments according to a respective length of each first ECC datum and forward the ECC segments to the flash memory interface controller, wherein each of the ECC segments is stored in different flash pages of a flash block through a pointer field pointing to a next ECC portion storing a next ECC segment;
   an ECC constructor configured to receive one or more of the ECC segments from the flash memory interface controller and generate a second ECC datum by combining the received ECC segments for each of the information data read from the flash memory; and
   an ECC decoder configured to correct errors of the information datum read from the flash memory based on the read information datum and the second ECC datum and forward the corrected read information datum to the host interface controller.

2. The flash memory controller of claim 1, wherein each of the information data is stored in a data area of a flash page of a flash block of the flash memory, and the ECC segments are stored in a plurality of spare areas of flash pages of the flash block of the flash memory.

3. The flash memory controller of claim 2, wherein one of the ECC segments from one of the first and the second ECC data is stored in same flash page storing a corresponding information datum.

4. The flash memory controller of claim 3, wherein the remaining ECC segments divided from the first ECC datum are stored in different flash pages of the flash block.

5. The flash memory controller of claim 2, wherein each of the flash pages of the flash memory is configured to store more than one of the ECC segments.

6. The flash memory controller of claim 5, wherein each of the flash pages of the flash memory is configured to store up to two of the ECC segments.

7. The flash memory controller of claim 2, wherein the flash memory interface controller is configured to store pointers along with the ECC segments to the flash memory to indicate the location of a next ECC segment.

8. The flash memory controller of claim 7, wherein a pointer of a last ECC segment of one of the first and the second ECC data points to itself or stores a NULL character.

9. The flash memory controller of claim 2, wherein the flash memory interface controller is configured to store a bitmap to the flash memory recording usage of the spare areas of the flash pages of one of the flash blocks of the flash memory.

10. The flash memory controller of claim 2, wherein the lengths of the ECC data generated by the ECC encoder are based on a quantity of errors of each flash page storing a corresponding information datum.

11. The flash memory controller of claim 1, wherein a length of the second ECC datum is extended when a quantity of errors of a corresponding information datum corrected by the ECC decoder surpasses a threshold value.

12. An error correction code (ECC) controller for a flash memory, comprising:
    an ECC encoder configured to generate first ECC data with variable lengths in response to information data to be stored in a flash memory;
    an ECC divider configured to divide each first ECC datum of the first ECC data into one or more ECC segments according to a respective length of each first ECC datum, wherein each of the ECC segments is stored in different flash pages of a flash block through a pointer field pointing to a next ECC portion storing a next ECC segment;
    an ECC constructor configured to generate a second ECC datum by combining one or more ECC segments for each information datum read from the flash memory; and
    an ECC decoder configured to correct errors of the information datum read from the flash memory by using the second ECC datum generated by the ECC constructor.

13. The ECC controller of claim 12, wherein each of the information data is stored in a data area of a flash page of a flash block of the flash memory, and the ECC segments are stored in a plurality of spare areas of flash pages of the flash block of the flash memory.

14. The ECC controller of claim 13, wherein one of the ECC segments from each of the first and the second ECC data is stored in a same flash page storing a corresponding information datum.

15. The ECC controller of claim 14, wherein the remaining ECC segments divided from the ECC datum are stored in different flash pages of the flash block.

16. The ECC controller of claim 13, wherein each flash page of the flash memory stores more than one of the ECC segments.

17. The ECC controller of claim 16, wherein each of the flash pages of the flash memory is configured to store up to two of the ECC segments.

18. The ECC controller of claim 13, wherein the lengths of the ECC data generated by the ECC encoder are based on a quantity of errors of each flash page storing a corresponding information datum.

19. The ECC controller of claim 12, wherein a length of the second ECC datum is extended when a quantity of errors of a corresponding information datum corrected by the ECC decoder surpasses a threshold value.

20. A flash memory system, comprising:
    a flash memory; and
    a flash memory controller according to one of the flash memory controllers of claim 1.

21. A method for encoding error correction code (ECC) data for information data to be stored in a flash memory, comprising:
    generating an ECC datum in response to an information datum to be stored in a flash memory;
    dividing the ECC datum into a plurality of ECC segments;
    storing the information datum to a flash page of a flash block of the flash memory; and
    storing the ECC segments to a plurality of flash pages of the flash block of the flash memory, wherein at least one ECC datum of the first ECC data is divided into the plurality of ECC segments which are stored in different flash pages of a flash block through a pointer field pointing to a next ECC portion storing a next ECC segment.

22. The method of claim 21, which further comprises:
    accessing a first ECC portion of the flash page which the information datum is to be stored in;

accessing a next ECC portion linked by the first accessed ECC portion if the first accessed ECC portion is not a last ECC portion of the flash page; and determining a length of the ECC datum according to a total number of the ECC portions being linked if the next accessed ECC portion is the last ECC portion, wherein each of the ECC portions stores one of the ECC segments.

23. The method of claim 22, wherein each of the ECC portions comprises a pointer field linking to the next ECC portion.

24. The method of claim 22, wherein each of the ECC portions in the same link belongs to different flash pages.

25. The method of claim 22, wherein each of the flash pages comprises a total of two of the ECC portions.

26. The method of claim 21, wherein the ECC segments are stored in the same flash block storing the information datum.

27. A method for correcting errors of information data stored in a flash memory, comprising:

reading an information datum stored in a flash memory;

combining a plurality of ECC segments stored in the flash memory into an ECC datum corresponding to the information datum, wherein at least one ECC datum of the first ECC data is divided into the plurality of ECC segments which are stored in different flash pages of a flash block through a pointer field pointing to a next ECC portion storing a next ECC segment; and correcting errors of the information datum by decoding an ECC codeword formed by the information datum and the ECC datum.

28. The method of claim 27, wherein the combining step comprises:

accessing a first ECC portion of the flash page in which the information datum is stored;

accessing a next ECC portion linked by the first accessed ECC portion if the first accessed ECC portion is not a last ECC portion; and combining the ECC segments stored in the first and next accessed ECC portions if the next accessed ECC portion is the last ECC portion, wherein each of the ECC portions stores one of the ECC segments.

29. The method of claim 28, wherein each of the ECC portions comprises a pointer field linking to the next ECC portion.

30. The method of claim 28, wherein each of the ECC portions in the same link belongs to different flash pages.

31. The method of claim 28, wherein each of the flash pages comprises a total of two ECC portions.

32. The method of claim 27, wherein the ECC segments are stored in the same flash block storing the information datum.

33. The method of claim 28, which further comprises:

linking another ECC portion to the last ECC portion if the number of corrected errors surpasses a threshold number.

34. The method of claim 28, which further comprises:

updating a bitmap indicating usage of the ECC portions of the flash block storing the information datum.

* * * * *